United States Patent

Marsh

[15] 3,660,594

[45] May 2, 1972

[54] LINE-SCAN TELEVISION SYSTEM EMPLOYING SPECTRUM ANALYSIS

[72] Inventor: Lawrence B. Marsh, Baltimore, Md.

[73] Assignee: The United States of America as represented by the Secretary of the Navy

[22] Filed: Mar. 14, 1969

[21] Appl. No.: 807,228

[52] U.S. Cl. ..................178/5.2 R, 178/504 CF, 178/DIG. 2, 178/DIG. 8, 178/DIG. 20, 250/83.3 H, 356/83

[51] Int. Cl. ..........................................H04n 9/04, H04n 9/06

[58] Field of Search....................356/74, 83, 96; 250/83.3 H; 178/5.2, 5.4, 6.7

[56] References Cited

UNITED STATES PATENTS

| | | | |
|---|---|---|---|
| 1,709,926 | 4/1929 | Weaver | 178/5.2 X |
| 2,004,359 | 6/1935 | Ahronheim | 178/5.2 |
| 2,324,270 | 7/1943 | Schlesman | 315/10 X |
| 2,871,465 | 1/1959 | Nielsen | 356/8.3 X |
| 3,504,975 | 4/1970 | White | 178/5.2 X |
| 3,068,465 | 12/1962 | Covely et al. | 178/7.88 UX |
| 3,560,642 | 2/1971 | Schroader | 178/6 X |

*Primary Examiner*—Robert L. Griffin
*Assistant Examiner*—Richard K. Eckert, Jr.
*Attorney*—R. S. Sciascia, J. A. Cooke and R. J. Erickson

[57] ABSTRACT

A line-scan television system adapted to be mounted aboard a satellite or similar vehicle for televising an object, such as the Earth or some other heavenly body, as the satellite orbits. A lens system views an elongated image swath perpendicular to the sub-orbital track and produces an elongated slit of light which, in turn, is divided into parallel image segments by suitable fiber optics. A plurality of prisms then spectrally disperse each of the image segments onto the photosensitive input surface of a suitable camera tube, such as an image dissector. This input image raster is then electronically scanned to generate corresponding output video information which is transmitted to a ground receiving station for image reproduction purposes. Scan control circuitry associated with the camera tube enables the spectrally dispersed image segments to be scanned to provide either a variable contrast control for black and white reception, as selected by a remote command signal, or to permit full-color television reception. The picture reproduction equipment at the ground station is time synchronized with the scanning of the spectrally dispersed input image segments at the camera tube.

17 Claims, 6 Drawing Figures

INVENTOR
LAWRENCE B. MARSH

BY J. O. Tresansky
ATTORNEY

INVENTOR
LAWRENCE B. MARSH

INVENTOR
LAWRENCE B. MARSH

INVENTOR
LAWRENCE B. MARSH

LINE-SCAN TELEVISION SYSTEM EMPLOYING SPECTRUM ANALYSIS

BACKGROUND OF THE INVENTION

In the previously proposed line-scan television systems adapted to be mounted aboard a vehicle such as an aircraft or a satellite, for example, an elongated image swath extending perpendicular or transverse to direction of relative motion is projected onto the light sensitive input surface of the camera tube. This narrow input image is scanned electronically to yield proportionate video output information which is then transmitted, along with appropriate time synchronization information, to a ground station where the image is reconstructed. However, in the previously proposed line-scan television systems, very little or no information as to the spectral composition of the input image being scanned was available, except for that which might be derived from knowing the spectral response of the particular photosensitive material employed on the input surface of the camera tube being used.

Another previously proposed and well-known method of obtaining a colored television system incorporates mechanical filters; e.g., one red, one blue and one green, ahead of three separate camera tubes. Such a system would obviously pose a serious weight problem, if contemplated for use aboard a satellite, and moreover, is necessarily quite complex in that suitable compensation has to be provided to insure that no color degradation results from variations in sensitivity among the camera tubes.

SUMMARY OF THE INVENTION

In order to overcome these and other deficiencies in the prior line-scan television systems, it is proposed in accordance with the present invention to divide the input image into a raster of image segments and then spectrally disperse the input image segments, for example by prisms or defraction grating, prior to applying them to the photosensitive faceplate of the camera tube. In other words, each image segment or picture element would be vertically defracted according to its spectral content.

The spectrally dispersed input image can then be utilized in either of two ways. For example, in accordance with one embodiment of the present invention, the image scanning circuitry is controlled so as to scan different spectral portions of the spectrally dispersed input image and thus can be utilized, for example, to yield a picture of lesser or greater contrast, dependent upon the spectra information contained in each portion of the image spectrum. More specifically, this variable filter effect is accomplished by biasing or shifting of the scanning beam vertically by a remote control signal communicated, for example, from a ground receiving station to the satellite-borne equipment.

A second embodiment of the present invention utilizes the spectrally dispersed input image to generate video information which, when transmitted to the ground receiving station, can be utilized to faithfully reproduce or reconstruct a full-color visual display of the image swath being viewed. In this second embodiment of the present invention, the entire spectrally dispersed input image is scanned, by means of proper timing and phasing signals. The resulting output video information from the camera tube is then transmitted, along with appropriate time synchronizing signal information indicating the camera tube scanning rates, to the ground receiving station where the video and synchronizing signals are utilized to reconstruct the image swath being viewed. It should be understood at this time that the present invention can be employed to provide black and white television coverage of the image swath being viewed, if desired, by merely reconstructing the image in accordance with the integrated spectrum of the input image.

In view of the foregoing, one object of the present invention is to provide a line-scan television system wherein the input image to the camera tube apparatus is spectrally dispersed.

A further object of the present invention is to provide a line-scan television system wherein a spectrally dispersed image is inputted to a camera tube where it is electronically scanned to derive output video information regarding the spectral content of the input image.

Another object of the present invention is to provide a line-scan television system wherein a selected portion of a spectrally dispersed input image to the camera tube is scanned in order to derive a video output signal which varies in accordance with the desired contrast in the reproduced or reconstructed image display.

A further object of the present invention is to provide a line-scan television system wherein the spectrally dispersed input image is electronically scanned so as to derive a video output signal enabling faithful reproduction, in full color, of the image being viewed.

A still further object of the present invention is to provide a line-scan television system of the type described adapted to be mounted aboard a satellite or other space vehicle.

Other objects, purposes and characteristics features of the present invention will in part be pointed out as the description of the present invention progresses and in part be obvious from the accompanying drawings wherein.

Figure 1:
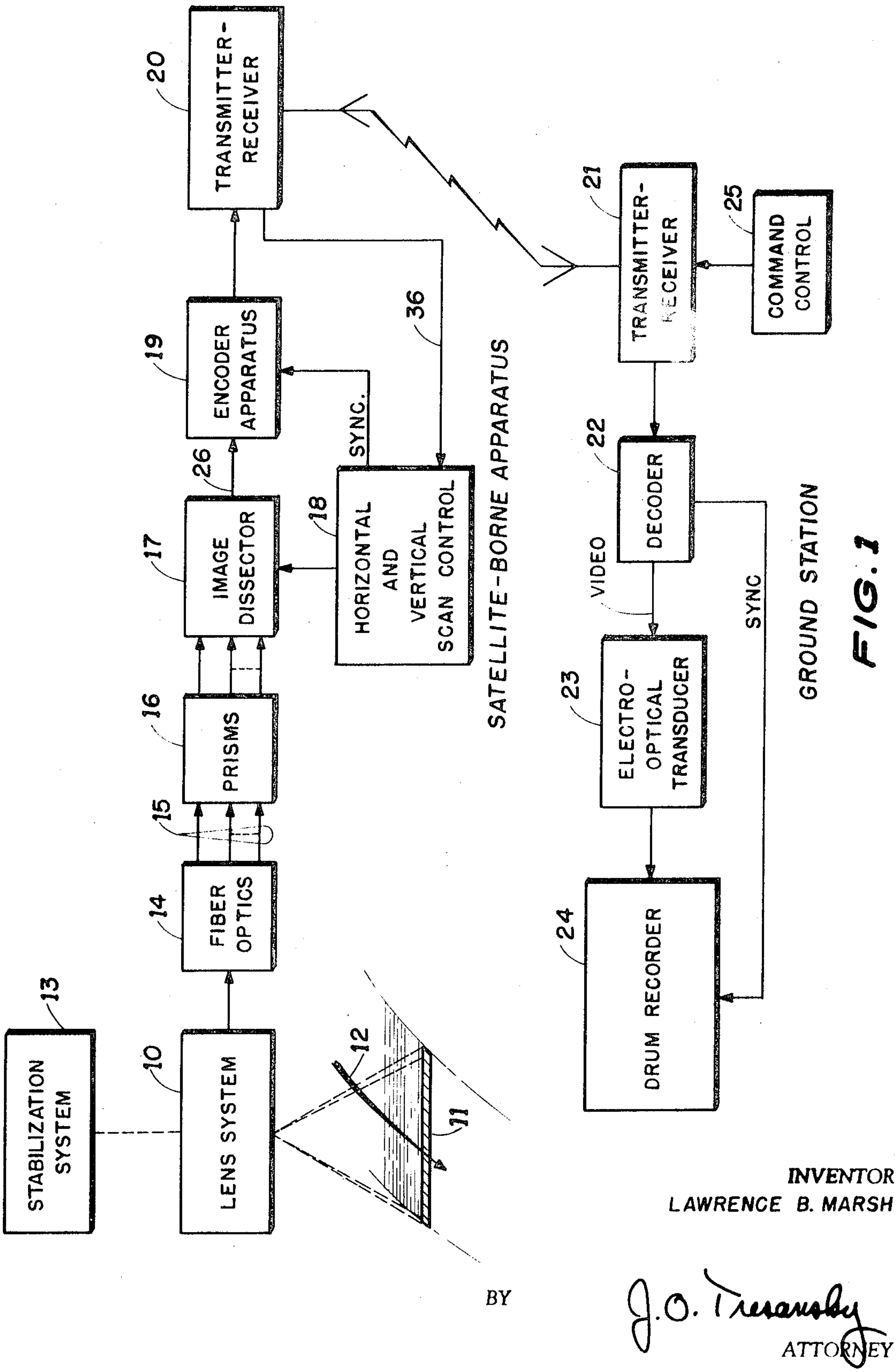
FIG. 1 is a block diagram of a satellite-borne line-scan television system incorporating the apparatus of the present invention.

Referring now to the general block diagram of FIG. 1, a line-scan television system incorporating the present invention is shown mounted aboard a stabilized satellite. A satellite-borne lens system 10, of any suitable design, views an elongated image swath 11 on the Earth's surface, for example. By way of illustration a typical image swath might be approximately 1,900 miles long and 0.5 miles wide; with the 0.5 mile swath width corresponding to the projection on the Earth's surface of one resolution element of the satellite-carried camera tube to be described in more detail hereinafter. As the satellite orbits the Earth or other heavenly body being viewed, with its sub-orbital track represented at 12, the satellite-borne television system operates to scan successive image swaths extending perpendicular to the sub-orbital track 12. As shown in FIG. 1, the satellite is preferably stabilized by system 13 so that the lens system 10 is always viewing the desired portion of the Earth's surface.

The lens system 10, comprising one or more optical lenses, converts the continually advancing image swath 12 into a line image output one resolution element wide and N resolution elements long which is then focused onto fiber optics 14. The fiber optics 14 are arranged to sub-divide the input line image into a plurality of parallel image line segments represented, in FIG. 1, by the lines 15 which are selectively applied to a group or plurality of prisms represented in the drawings at block 16. These prisms 16 function to spectrally disperse the associated image segments onto the photosensitive faceplate of camera tube 17, in the form of an inner raster (see FIG. 3). It should be obvious that the prisms 16 may be replaced by defraction gratings if desired, without departing from the spirit or scope of the present invention.

In FIG. 1, the camera tube 17 is illustrated, by way of example, as being an image dissector which has a photosensitive faceplate or photocathode which emits electrons in proportion to the light intensity contained in the input image segments as is well-known to those skilled in the art. These emitted electrons are subsequently focused and accelerated towards the multiplier section of the image dissector. A mechanical aperture is interposed ahead of the multiplier section so that the number of electrons capable of reaching the multiplier section is controllable in accordance with control voltages applied to the deflection coil assembly of the image dissector. In other words, by controlling the deflection voltage signals (horizontal and vertical) applied to the image dissector 17, the input image raster may be scanned, as desired, to thereby generate a video output current proportional to the input light intensity within the spectrally dispersed input image segments. As shown in FIG. 1, the illustrated image dissector 17 receives its deflection control voltages from the horizontal and vertical scan control unit 18 which forms part of the present invention and will be described in detail hereinafter. The video output signal from the image dissector 17 is applied to encoder apparatus 19 which encodes the video information, along with time synchronizing signals from the scan control unit 18 (designated as SYNC in FIG. 1), onto a suitable carrier frequency to be transmitted to the ground station of FIG. 1, by the transmitter-receiver unit 20.

At the typical ground station, the received video and SYNC information are applied, by the transmitter-receiver unit 21, to a suitable decoder unit 22 which separates the video from the SYNC information. The video information is then applied to a suitable electro-optical transducer unit 23, to be described in more detail hereinafter, which converts the transmitted video information back into an optical or light signal for application to a suitable display device 24, such as a drum recorder or the like. The SYNC information is also applied to the display unit 24 so as to maintain time synchronism between image reconstruction at the display unit 24 and the rate of input image scanning at camera tube 17.

As will be described in more detail hereinafter, in one embodiment of the present invention the illustrated apparatus is capable of selectively scanning different spectral regions of the input image and thus provide variable contrast control, for example, within the television system. For this purpose, a command control unit 25 is included in the ground station equipment for selecting a remote control signal to be transmitted by transmitter-receiver unit 21 to the satellite-borne television apparatus. This command signal is applied, by the satellite's transmitter-receiver apparatus 20, to the scan control unit 18 for the purpose of vertically shifting the portion of the input spectrally dispersed image segments which is scanned and converted into video information. Inasmuch as the input image segments will normally contain varying amounts of energy in the different portions or regions of their spectrums, this remotely controlled varying or shifting of the scanned portion of the spectrum enables the ground station to adjust the contrast in the finally reproduced or reconstructed image.

Figures 2, 3:
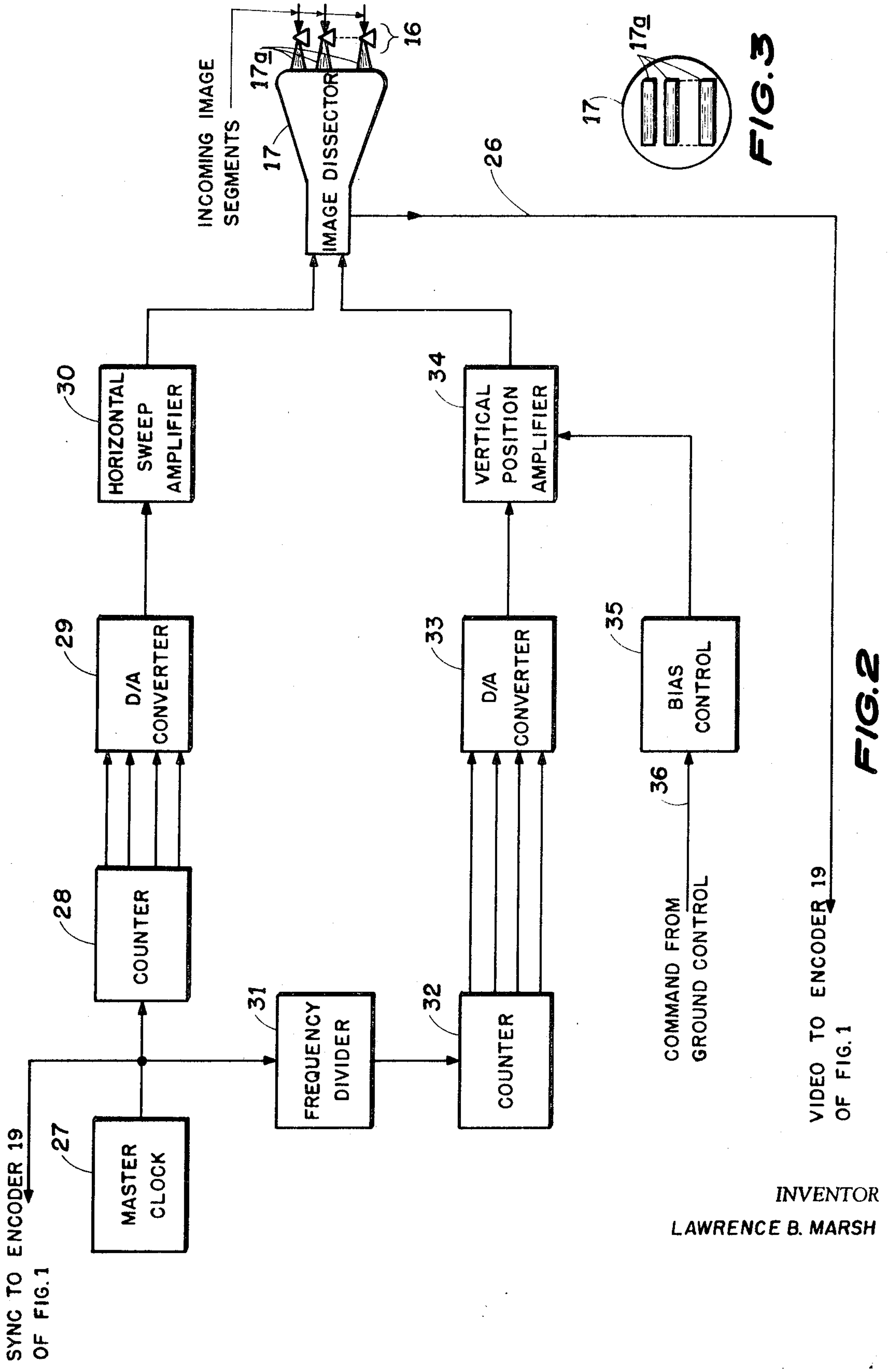
FIG. 2 illustrates, in block diagram form, one embodiment of the present invention utilized to provide variable contrast control in the line-scan television system of FIG. 1.
FIG. 3 is a front view of the camera tube employed in the line-scan television apparatus of FIG. 2 and illustrates the input image raster.

More specifically, this contrast control embodiment of the present invention is shown in more detail in FIG. 2 of the drawings. The incoming image segments from the fiber optic assembly 14 of FIG. 1 are spectrally dispersed, by an associated plurality of prisms illustrated at 16 in FIG. 2, onto the photosensitive input surface or photo cathode of the image dissector 17. As shown most clearly in FIG. 3 of the drawings, the spectrally dispersed image segments 17*a* are in the form of an image raster. As will now be described in detail, the image dissector 17 is supplied with horizontal and vertical scanning control voltage signals which electronically scan these input spectrally dispersed image segments 17*a* to generate a proportional video output signal which is applied, over line 26, to the encoder apparatus 19 of FIG. 1, for subsequent transmission to the ground station.

A master clock 27, having a predetermined clocking frequency, applies its output clock pulses to a suitable pulse counter 28 which, in turn, is connected to a digital to analog converter 29 where the registered clock count is converted into a proportionate or analog voltage signal. This analog signal is in the form of a staircase voltage signal having one step for each resolution element contained along the horizontal length of an input image segment 17*a*. After amplification, staircase voltage signal is applied as control input to the horizontal deflection apparatus of the image dissector 17. Obviously, the counting format of counter 28 and the clocking frequency of clock source 27 are selected in accordance with the desired rate at which the input image segment are to be horizontally scanned from the photosensitive face of the image dissector 17.

The output of the master clock pulse source 27 is also applied to a frequency divider 31 which divides the clock frequency and applies it to a pulse counter 32. The division rate of the divider 31 and the counting format of the counter 32 are selected in accordance with the desired vertical scanning rate for the input image segments. More specifically, the divider 31 functions to scale down the clock pulses and apply an output pulse to counter 32 for each image segment in the input image raster.

The analog voltage produced by the converter unit 33 is proportionate to the digital pulse count registered on counter 32 and is applied to a vertical position amplifier 34. The resulting amplified analog voltage is a second staircase signal, containing one step for each input image segment, which is applied to the vertical deflection coil of the image dissector 17 for vertically scanning the input image segments. Moreover, the base level of the staircase voltage output from the amplifier 34 is variable, so as to select different portions of the spectrally dispersed input image segments for scanning or readout, by a signal received from the illustrated bias control unit 35. As mentioned previously, bias control unit 35 is in turn, operated by a ground command signal received on input line 36 connected to the satellite transmitter-receiver unit 20 in FIG. 1. Inasmuch as each of the incoming images will normally have an unequal energy distribution throughout its spectrum, varying the base level of the staircase voltage from amplifier 34 will cause the video output signal from the image dissector to contain more or less picture contrast, as desired.

Figure 4:
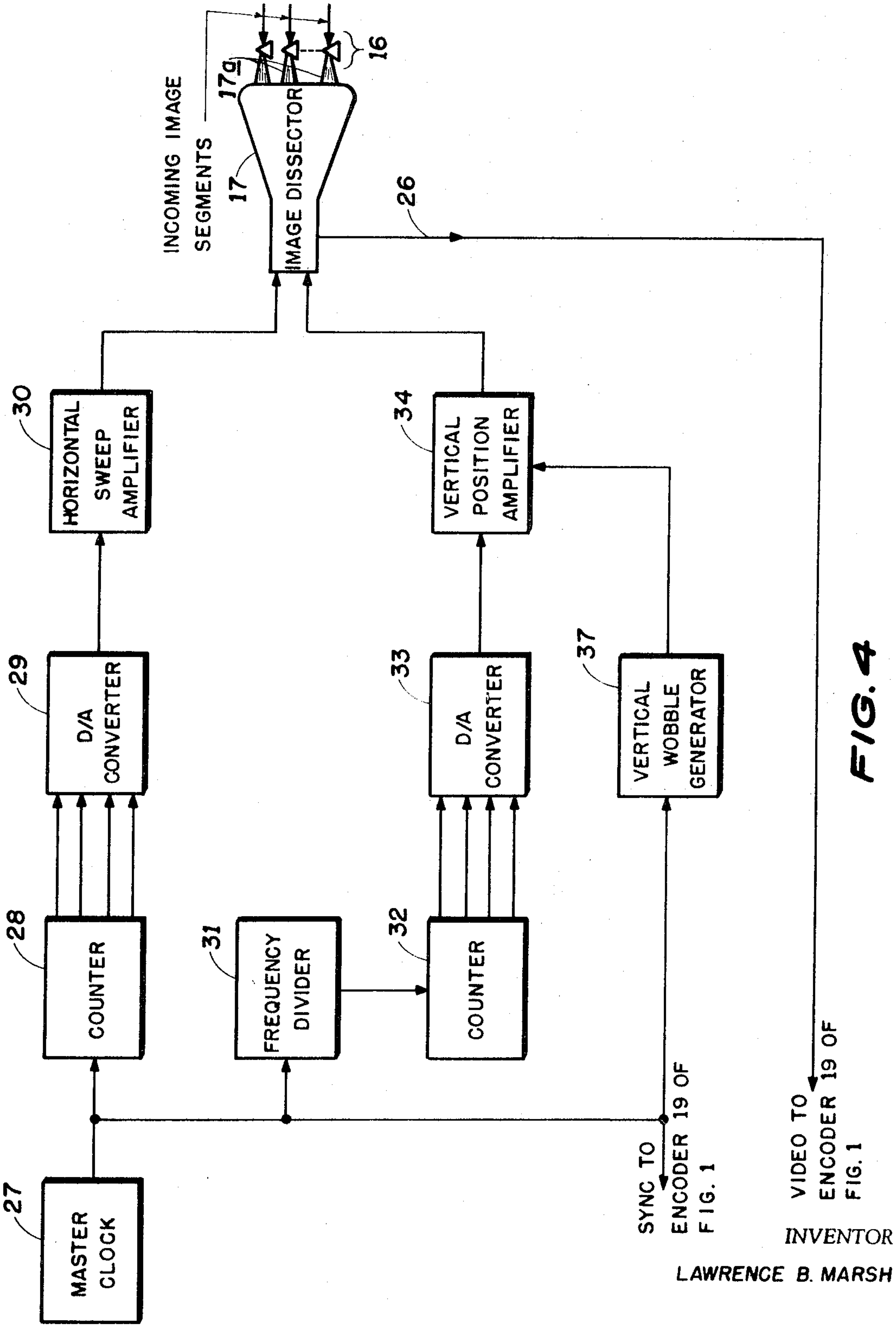
FIG. 4 illustrates a second embodiment of the proposed line-scan television apparatus of the present invention capable of reproducing, in full color, the image being viewed.

Referring now to FIg. 4, the full colored television embodiment of the present invention employs much the same apparatus as the contrast control embodiment illustrated in FIG. 2, with the exception that a vertical wobble generator 37 has replaced the bias control unit 35 in FIG. 2. This vertical wobble generator 37 receives the clocking output from master clock source 27 and converts these clock pulses into a corresponding series of sawtooth pulses at clock frequency. These sawtooth or wobble pulses from generator 37 are subsequently applied to the vertical position amplifier 34 where they are superimposed upon the staircase voltage output from converter 33.

Since the wobble pulses are also at clock frequency, they operate to vertically scan the spectrum content for each of the successive resolution elements contained in each of the spectrally dispersed image segments 17*a*. Consequently, the resulting video output information on line 26 is a current proportional to the spectral energy contained in each resolution element of the incoming image segments 17*a*. This output video information on line 26 is applied to the encoder apparatus 19 of FIG. 1 for subsequent transmission to the ground receiving station, along with the output of the master clock 27 which serves as the time synchronizing or SYNC signal.

Figures 5, 6:
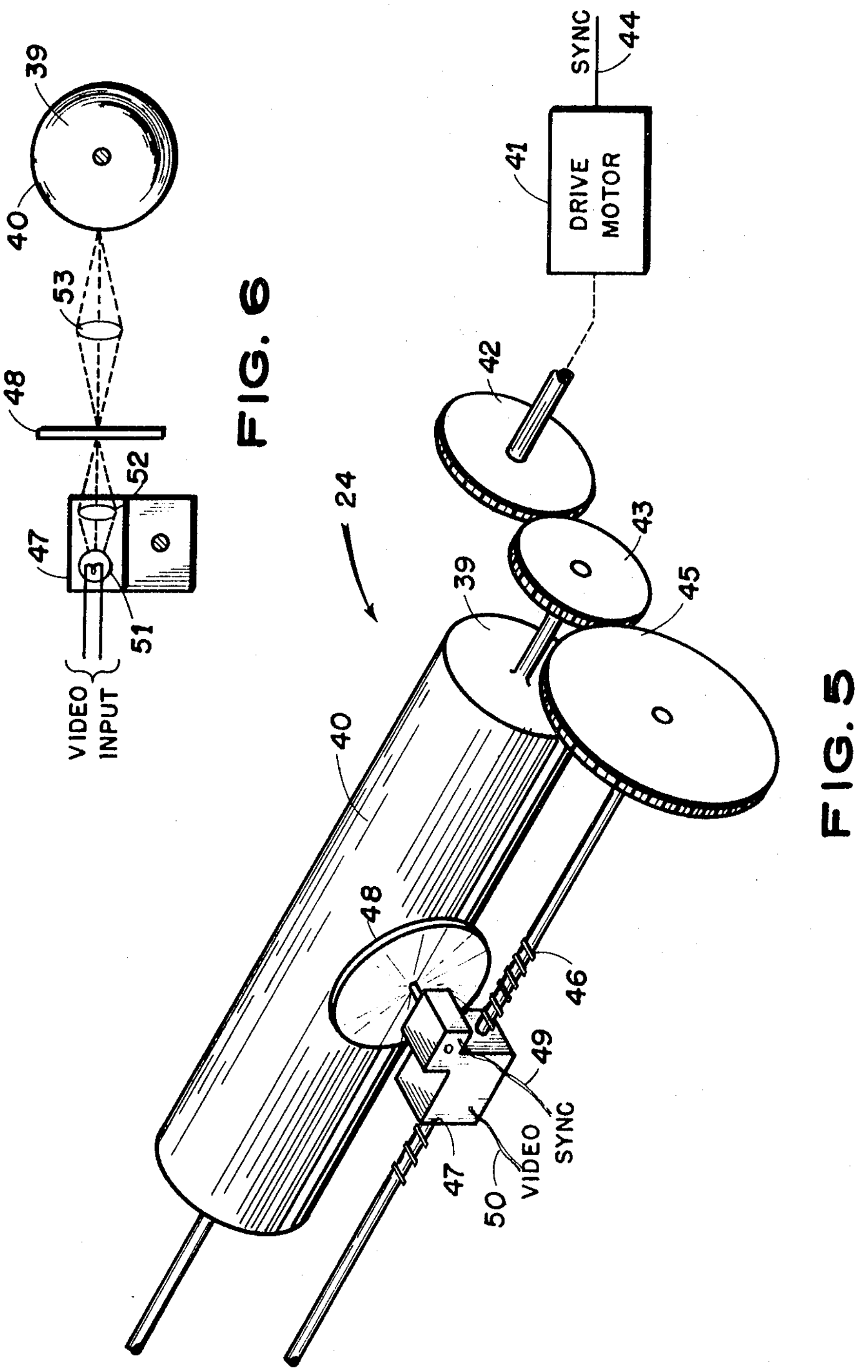
FIG. 5 illustrates one form of image reproducing or reconstructing apparatus for use with the proposed apparatus shown in FIG. 4.
FIG. 6 illustrates diagrammatically how the video signal produced by the apparatus of FIG. 4 is used in the apparatus of FIG. 5 to reproduce a full color display of the image being televised.

Referring now to FIG. 5, the reconstruction of the colored television image, from the video and SYNC signals thus derived by the apparatus of FIG. 4 of the drawings, may be accomplished by utilizing, for example, a suitable drum recorder generally designated at 24. More specifically, the drum recorder includes a film drum 39 which carries a suitable photographic film designated at 40. The drum 39 is rotated by drive motor 41 and suitable gearing 42–43, at a speed in synchronism with the rate at which the input image segments 17*a* (see FIG. 4) are being horizontally scanned, under the control of the input SYNC signal on line 44 to the drive motor 41. The gear 43 also drives a gear 45 which, in turn, rotates a worm gear member 46 that support an electro-optical transducer carriage unit 47. The gear ratio 43–45 is selected such that transducer unit 47 travels along member 46 at a rate synchronized with the vertical scanning of the input image segments 17*a* at the camera tube 17 of FIG. 4. A multicolored filter wheel 48 is supported by the unit 47 and is also rotated (by any suitable means not shown) in synchronism with the vertical scanning rate at the image dissector of FIG. 4, as represented by the SYNC input at line 49. Video input is applied to the transducer unit 47 via input line 50.

Referring now to FIG. 6, the electro-optical transducer 47 includes a suitable light source designated at 51 and a lens 52. The input video information is applied to the lamp 51 and thereby varies the intensity of the light output from the lamp 51 in accordance with the magnitude of the input video signal; i.e., in accordance with the energy contained in the spectrally dispersed image segments received at the image dissector 17 in FIG. 4. This light output from the lamp 51 is then focused by the lens 52 onto the filter wheel 48 which, as mentioned previously, rotates in synchronism with the vertical scanning or wobble rate of the image dissector 17. The resulting colored output light from the filter wheel 48 is then focused by lens 53 onto the film 40. The resulting picture reproduced on film 40 is thus a faithful, full-color reconstruction of the actual image being viewed by the satellite-borne television apparatus.

Obviously, many modifications, adaptations and alterations of the present invention, in addition to those pointed out above, are possible in the light of the above teachings. Therefore, it should be understood at this time that within the scope of the appended claims the invention may be practiced otherwise than as specifically described.

What is claimed: is:

1. In a line-scan television system including a camera tube means for televising an object during relative movement between said object and said camera tube means, the combination comprising,
  a photosensitive image input surface on said camera tube means,
  a lens system for viewing an elongated swath on the surface of the object being televised extending perpendicular to the direction of said relative movement and converting said elongated swath into a narrow slit of image input light for said camera tube means,
  means interposed between said lens system and said camera tube for spectrally dispersing said slit of light transversely to its length and applying it as an input image to said photosensitive image input surface,
  said input image having a width corresponding to the dimension of one resolution element of said camera tube and having a length corresponding to a plurality of side-by-side resolution elements, and
  circuit means operably connected to said camera tube means for controllably scanning the width of said spectrally dispersed input image repeatedly, once for each resolution element contained within the length of said spectrally dispersed input image to produce a video output signal indicative of substantially the total spectral content within each resolution element of said input image.

2. The combination specified in claim 1 wherein said camera tube is an image dissector equipped with horizontal and vertical deflection means, said input image is spectrally dispersed vertically and applied to the photosensitive image input surface of said camera tube, and said scanning circuit means comprises,
  a source for generating clock pulses at a predetermined frequency,
  first deflection voltage producing means operably connected to said clock pulse source for generating a staircase voltage signal and applying it to the horizontal deflection means of said image dissector,
  said staircase voltage signal containing a voltage step for each resolution element along the length of said input image effective to sequentially scan horizontally each resolution element contained in the length of said input image, and
  second deflection voltage producing means operably connected to said clock pulse source for producing a series of sawtooth voltage signals and applying it to the vertical deflection means of said image dissector,
  said series of sawtooth voltage signals including one sawtooth voltage signal for each resolution element contained in the length of said input image effective to vertically scan the spectral content of said spectrally dispersed input image for each resolution element contained in the length of said input image.

3. The combination specified in claim 1 further including image reconstructing means responsive to said video output signal for reconstructing a colored visual display of said input image.

4. The combination specified in claim 3 wherein said means for reconstructing said colored display comprises,
  a photosensitive film,
  a multicolored rotary disc filter rotated in syncchronism with the rate of scanning said spectrally dispersed image at said camera tube,
  light source means for directing light through said multicolored disc filter onto said film,
  means responsive to said video output signal for varying the output light intensity of said light source, and
  means for causing relative movement between said film and said light source in synchronism with the rate of scanning said spectrally dispersed image at said camera tube.

5. The combination specified in claim 2 further including,
  means receptive to the slit of light from said lens system for dividing said slit of light along its length into parallel light segments,
  said spectral dispersing means being effective to spectrally disperse each of said light segments and apply them to the photosensitive image input surface of said camera tube in the form of a raster of image segments,
  first counter means operably connected to said clock pulse source for registering a digital count of said clock pulses,
  said first deflection voltage producing means being operably connected to said first counter means for converting said digital count into a series of first staircase voltage signals and applying them to the horizontal deflection means of said image dissector,
  each of said first staircase voltage signals including a number of voltage steps corresponding to the number of resolution elements represented by the length of each spectrally dispersed image segment,
  means operably connected to said clock pulse source for dividing said clock frequency by the number of voltage steps contained in each of said first staircase voltage signals to produce a scaled-down pulse series,
  second counter means operably connected to said dividing means for registering a digital count of said scaled-down pulses, and
  means operably connected to said second counter means for converting said scaled-down pulse count into a second staircase voltage signal and applying it to the vertical deflection means of said image dissector,
  said second staircase voltage signal containing a number of voltage steps corresponding to the number of image segments in said image raster,
  said second deflection voltage producing means being connected to superimpose a series of sawtooth voltage signals on each voltage step of said second staircase voltage signal for vertically scanning the spectral content of each resolution element contained in the length of each image segment.

6. In a line-scan television system including a camera tube means for televising an object during relative movement between said object and said camera tube means, the combination comprising, a photosensitive image input surface on said camera tube means, said camera tube means having a resolution element of predetermized size, a lens system for viewing an elongated swath on the surface of the object being televised extending perpendicular to the direction of said relative movement and converting said elongated swath into a narrow slit of image input light for said camera tube means, means receptive to the slit of light from said lens system for dividing said slit of light along its length into parallel light segments, means receptive to said parallel light segments for spectrally dispersing said light segments onto said photosensitive image input surface in the form of a raster of image segments, and circuit means operably connected to said camera tube means for controllably scanning said spectrally dispersed input image segments to produce a proportionate video output signal, said scanning circuit means including, means for applying a horizontal scanning signal to said camera tube means effective to successively cause said video output signal to be proportionate to adjacent portions of each of said spectrally dispersed input image segments.

said adjacent portions of each of said input image segments extending along the length of said input image segments and each adjacent portion being the width of one resolution element, and means for applying a variable vertical scanning signal to said camera tube means effective to alter the vertical position in each of said spectrally dispersed input image segments at which said adjacent portions are located.

7. The combination specified in claim 6 wherein said camera tube means is an image dissector having a resolution element of predetermined size and being equipped with horizontal and vertical deflection means and said scanning circuit means comprises, a source for generating clock pulses at a predetermined frequency, first counter means operably connected to said clock pulse source for registering a digital count of said clock pulses, first deflection voltage producing means operably connected to said first counter means for converting said digital count into a series of first staircase voltage signals and applying them to the horizontal deflection means of said image dissector, each staircase voltage signal including a number of voltage steps corresponding to the number of resolution elements represented by the length of each spectrally dispersed image segment, means operably connected to said clock pulse source for dividing said clock frequency by the number of voltage steps contained in each staircase voltage signal to produce a scaled-down pulse series, second counter means operably connected to said dividing means for registering a digital count of said scaled-down pulses, second deflection voltage producing means operably connected to said second counter means for converting said scaled-down pulse count into a second staircase voltage signal and applying it to the vertical deflection means of said image dissector, said second staircase voltage signal containing a number of voltage steps corresponding to the number of image segments in said image raster, and control means operably connected to said second deflection voltage producing means for controlling said second staircase voltage signal in accordance with desired vertical scanning position relative to each spectrally dispersed image signal.

8. The combination specified in claim 7 wherein said control means for controlling said second staircase voltage signal comprises means for shifting the base level of said second staircase voltage signal 9. The combination specified in claim 8 wherein said shifting means are remotely controlled.

10. The combination specified in claim 7 wherein said control means for controlling said second staircase voltage signal comprises a sawtooth generator circuit operably connected to said clock pulse source and said second deflection voltage producing means for superimposing on said second staircase voltage signal a series of sawtooth pulses effective to vertically scan each resolution element contained within the length of each spectrally dispersed image segment and produce a video output signal which is proportionate to the spectral information associated with each resolution element in said spectrally dispersed image segments.

11. The combination specified in claim 10 further including, a transmitting means operably connected to receive the video output signal from said image dissector and the output of said clock pulse source for transmitting said video output signal and said clock pulse output to a distant location, said clock pulse output being utilized as a time synchronizing signal, receiving means at said distant location for receiving said transmitted video and synchronizing signals, a photosensitive film, a multicolored rotary disc filter, light source means for directing light through said rotary disc filter onto said film, means responsive to said received video signal for varying the output light intensity of said light source, and means responsive to said received synchronizing signal for rotating said rotary disc filter and for causing relative movement between said film and said light source in synchronism with the rate of scanning said spectrally dispersed image segments at said image dissector.

12. The line-scan television system specified in claim 6 wherein said camera tube means is mounted aboard a satellite and said object being viewed is a heavenly body about which said satellite is orbiting.

13. The combination specified in claim 6 wherein said spectral dispersing means comprises a plurality of prisms.

14. The combination specified in claim 6 wherein said camera tube means is an image dissector.

15. The combination specified in claim 6 wherein said light dividing means comprises fiber optic means.

16. The combination specified in claim 6 and further including, transmitting means operably connected to the output of said camera tube means for transmitting said proportionate video output signal to a distant station, means located at said distant location for receiving said transmitted video output signal, and means responsive to said received video signal for reconstructing a visual display of said input image in accordance with said received video signal.

17. The combination specified in claim 16 further including means for maintaining synchronization between the reconstruction of said visual display and the image scanning at said camera tube.

* * * * *